Aug. 19, 1924.
R. A. ZIMMERMAN
SAW GUIDE
Filed April 16, 1923
1,505,119
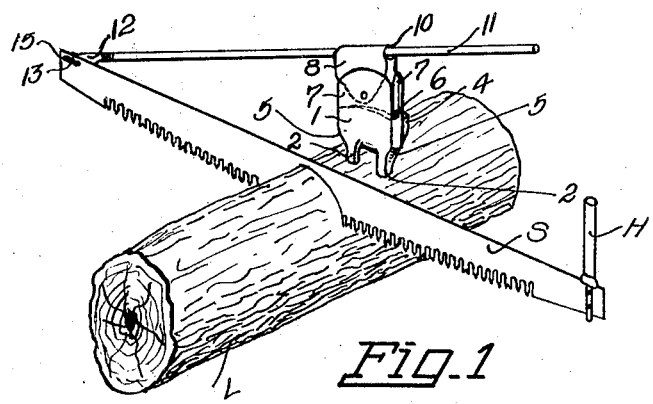
Fig. 1
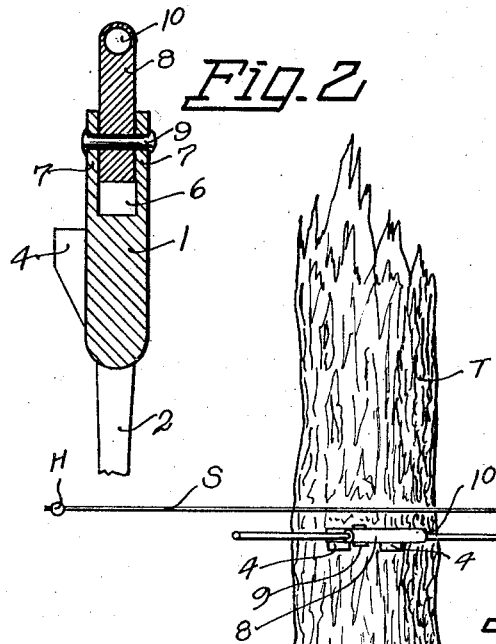
Fig. 2
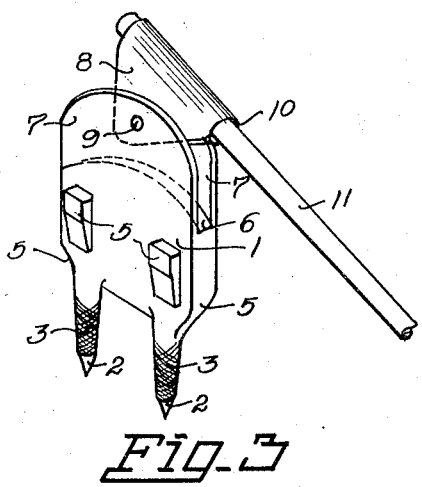
Fig. 3
Fig. 4
Inventor
Richard A. Zimmerman Patented Aug. 19, 1924.

1,505,119

UNITED STATES PATENT OFFICE.

RICHARD A. ZIMMERMAN, OF SPOKANE, WASHINGTON.

SAW GUIDE.

Application filed April 16, 1923. Serial No. 632,561.

*To all whom it may concern:*

Be it known that I, RICHARD A. ZIMMERMAN, a citizen of the United States, residing at Spokane, in Spokane County and State of Washington, have invented certain new and useful Improvements in Saw Guides, of which the following is a specification.

My present invention relates to improvements in saw guides designed especially for use in connection with manually operated cross cut saws of the reciprocating or drag type.

Usually in sawing trees or logs with manually operated saws, it is necessary that two men be employed, one at each end of the saw, for supporting the saw, guiding its movement and preventing buckling or ruffling of the saw blade. The primary object of my invention is the provision of means attached at one end of this type of saw for supporting and guiding the saw in lieu of one of the sawyers, and in order that the saw may freely and conveniently be manipulated from the free end of the saw by a single sawyer. By the utilization of my invention a portable, manually operated sawing machine is furnished, requiring the services of one sawyer, and which is comparatively inexpensive in construction and simple in operation.

To this end the invention consists in certain novel combinations and arrangements of parts whereby one end of the reciprocating saw is supported and guided from the standing tree or fallen log in such manner that the saw may be properly manipulated for the efficient performance of its functions.

In the accompanying drawings I have illustrated one complete example of the physical embodiment of my invention wherein the parts are combined and arranged according to the best mode I have thus far devised for the practical application of the principles of my invention, and which has proven highly satisfactory in actual service.

Figure 1 is a perspective view showing a saw and its support embodying my invention, and in operative relation with a log.

Figure 2 is an enlarged detail, sectional view through the base or supporting member for the saw.

Figure 3 is a perspective view of the base or support.

Figure 4 is a view in elevation showing the saw and its support in operative position with relation to a tree trunk.

The saw S is of the cross cut type and provided with the usual handle H, and is of such length as to require the services of two sawyers under existing conditions. With the aid of the supporting device of my invention the saw may be manipulated by one sawyer to cut either a fallen log L or to cut standing timber as indicated by the tree trunk T in Fig. 4.

The main supporting member or base 1 is preferably a metal block of suitable size and fashioned with spikes as 2, 2, which are driven into the log or tree to rigidly secure the base thereon. The spikes may be knurled at 3, 3 to assist in retaining them in the wood, and the base is fashioned with a pair of exterior driving lugs as 4, 4, each one alined with a spike in order that the spikes may be driven into the wood by blows from a sledge hammer or other tool on these driving lugs.

For extracting the base or supporting member from the tree or log, I utilize the shoulders 5, 5, on the base member, under which a tool may be applied and the base member pried loose from the log or tree.

The base member, when rigidly attached to a tree or log, forms a supporting bracket for flexible connections therefrom to the saw, and for this purpose the base or bracket is fashioned with a groove 6 formed between a pair of complementary, perforated ears 7, 7. In the groove and between these ears an oscillatable head 8 is pivoted on the bolt or rivet 9 which passes through the ears. The head is flattened and fits neatly between the ears in order that it may oscillate on its pivot, but is prevented from moving laterally on the pivot and is supported, when the saw is used in horizontal position, by one of these ears and guided by both of them. When used in vertical position the head, as in Fig. 1, is retained between these ears and guided in its oscillating movement by the ears.

The oscillating head is fashioned with an opening or socket 10 extending therethrough for the accommodation of a slide rod 11, the free end of which rod is passed through the socket and slides therein as the head is oscillated. Preferably the rod is round in cross section, and may be lubricated in order that it may slide freely in the socket of the head.

One end of the rod is connected with the saw and for this purpose the rod has an offset, or inset perforated head 12, through which a bolt 13 is passed, said bolt also passing through a complementary opening in the saw blade and provided with a head 14 bearing against the saw blade. The free end of the bolt is provided with a lock nut 15 to retain the parts in proper position.

In use the base or supporting member is affixed to the log, as in Fig. 1 say two or three inches to the right of the line of proposed cut, and the offset head 12 of the rod 11 compensates for this distance in order that the saw blade and rod may be maintained in parallelism. The saw is manipulated from the handle H in usual manner, and as it reciprocates the pivoted rod 11 carried thereby is oscillated on the bolt 13. The free end of the rod is retained by the oscillatable head 8 and consequently said head partakes of the movement of the rod, but the latter slides backward and forward through the head thus varying the distance between its pivoted end and the oscillating head. The head and the rod, as is also the saw, are maintained in straight line movements by the ears 7 7 of the base member which guide the head between them, and thus the saw is prevented from buckling or ruffling at its mechanically supported end. The sawyer takes care of the saw blade at his own end of the saw.

When the support is used on a standing tree, it is usually attached to the tree below the line of proposed cut, to permit the tree to fall away from the trunk without danger to the device. In this horizontal position the ears of the base support and guide the oscillating head, and the saw blade and rod are maintained in parallel, straight positions. As the saw penetrates the wood and sinks into the cut the oscillatable head is tilted with relation to its base, and in this tilted position continues to oscillate as the saw is reciprocated. Thus when the cut is started the oscillatable head, in Fig. 1, may be standing in upright or perpendicular position, but when the cut is complete the head may be tilted or swung to angular position to the vertical. By this arrangement of parts and cooperation of the elements the necessary movements of the saw are accomplished to secure best results in cutting either fallen timber or standing trees.

It will be obvious that the parts may with facility be detached, if necessary, and with equal facility be again assembled in operative relation; that the saw and its support may with convenience be applied to the work, and that when the work is completed, the rod 11 may be disengaged from its head and a sledge used, alternately on the shoulders 5 to extract the base member from the tree or log.

Having thus fully described my invention, what I claim as new and desire to secure by Letters Patent is:—

1. The combination with a base member of a pivoted head supported to oscillate thereon, a rod slidable in said head, a manually operated reciprocable saw, and a pivotal connection between said saw and rod.

2. The combination with a base having perforated, spaced ears, of an oscillatable head pivoted between said ears and formed with an opening therethrough, a rod slidably supported in the head-opening, an offset perforated head on said rod, a manually operated saw, and pivoted connection between said offset head and saw.

3. The combination with a base having attaching spikes, driving lugs on said base, and oppositely arranged extracting shoulders on said base, of a manually operated saw, an oscillatable head supported on said base, a rod pivoted on said saw, and said rod having a sliding connection with said head.

In testimony whereof I affix my signature.

RICHARD A. ZIMMERMAN.